United States Patent
Kleihorst et al.

(10) Patent No.: US 6,633,676 B1
(45) Date of Patent: Oct. 14, 2003

(54) ENCODING A VIDEO SIGNAL

(75) Inventors: Richard Petrus Kleihorst, Eindhoven (NL); Marc Joseph Rita Op De Beeck, Eindhoven (NL); Albert Van Der Werf, Eindhoven (NL); Andre Van Der Avoird, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/572,993

(22) Filed: May 17, 2000

(30) Foreign Application Priority Data

May 27, 1999 (EP) .............................................. 99201695

(51) Int. Cl.[7] ................................................ G06K 9/36
(52) U.S. Cl. ..................................................... 382/236
(58) Field of Search ................................ 382/232, 236, 382/238, 251, 254, 298, 299, 300, 308; 348/394.1, 397.1, 399.1, 400.1, 401.1, 404.1, 408.1, 409.1, 411.1, 415.1, 421.1, 422.1, 425.1, 427.1; 375/240.03, 240.04, 240.05, 240.12, 240.13, 240.15, 240.16, 240.17, 240.21, 240.25, 240.27, 240.29, 240.19

(56) References Cited

U.S. PATENT DOCUMENTS

| | | | |
|---|---|---|---|
| 5,696,848 A | * 12/1997 | Patti et al. | |
| 6,122,321 A | * 9/2000 | Sazzad et al. | 375/240.03 |
| 6,148,032 A | * 11/2000 | Pearlstein et al. | 375/240.15 |
| 6,154,491 A | * 11/2000 | Uetani et al. | 375/240.01 |
| 6,222,886 B1 | * 4/2001 | Yogeshwar | 375/240.23 |
| 6,385,248 B1 | * 5/2002 | Pearlstein et al. | 375/240.25 |
| 6,442,203 B1 | * 8/2002 | Demos | 375/240.16 |

FOREIGN PATENT DOCUMENTS

| | | | |
|---|---|---|---|
| EP | 0731600 A2 | 11/1996 | H04N/5/14 |
| WO | WO9933024 | 1/1999 | |

OTHER PUBLICATIONS

Jeongnam Youn et al, "Motion Estimation for High Performance Transcoding", 1998 IEEE, XP–002096503, pp. 649–658.

Debin Chen et al, "Extraction of High–Resolution Video Stills from MPEG Image Sequences", 1998 IEEE, XP–000870448, pp. 465–469.

Debin Chen et al, "Extraction of High–Resolution Video Stills from MPEG Picture Sequences", ICIP '98, Oct. 1998, Chicago.

Regis Saint Girons, "The Digital Simulcast AD–HDTV Coding System", IEEE Trans. on Consumer Elctronics vol. 38, No. 4, Nov. 1992, pp. 778–782.

Ser. No. 09/216,266, filed Dec. 18, 1998, PHN 16,674.

* cited by examiner

Primary Examiner—Jose L. Couso

(57) ABSTRACT

Method and arrangement for encoding a video signal, wherein a selection (39) is made between the generation of a motion-compensated encoded video signal (I, B, P) and the generation of a higher-resolution picture ($I_H$). The creation of the higher-resolution picture ($I_H$) relies on estimating motion in a series of subsequent pictures ($f_{1,2,3}, \ldots$) of lower resolution. The higher-resolution picture ($I_H$) is interpolated (38) from these pictures ($f_{1,2,3}, \ldots$). In a preferred embodiment of the invention, previously determined regions of interest (S(ROI)) are selected (36) from the video signal. The pictures relating to these regions of interest ($f_{1,2,3}, \ldots$) occupy less memory (33) than entire pictures as picked up by an image sensor (2). A conventional picture memory (33) is sufficient to store the series of pictures ($f_{1,2,3}, \ldots$) that relates to a certain region of interest. Motion estimation (31) is performed on these pictures and their motion vectors (m) are stored in a vector memory (37). The higher-resolution pictures ($I_H$) are interpolated (38) from the stored pictures ($f_{1,2,3}, \ldots$) and their motion vectors (m). The invention is applicable for sensor (2)-encoder (3) integration, for example in a camera system (1).

7 Claims, 2 Drawing Sheets

ENCODING A VIDEO SIGNAL

The invention relates to a method of encoding a video signal comprising a series of pictures in a motion-compensated encoder, said method comprising the steps of receiving the series of pictures and estimating motion vectors in the series of pictures with sub-resolution accuracy.

The invention also relates to a motion-compensated encoder for encoding a video signal comprising a series of pictures, said encoder comprising receiving means for receiving the series of pictures, estimation means for estimating motion vectors in the series of pictures with sub-resolution accuracy, a picture memory for storing the pictures, and means for forming and supplying a motion-compensated encoded video signal by means of the picture memory.

The invention further relates to a camera system comprising an image sensor for picking up a video signal which comprises a series of pictures, and a motion-compensated encoder.

The article by Regis Saint Girons "The digital simulcast AD-HDTV coding system", IEEE Trans. on Consumer Electr. Vol. 38, No. 4, November 1992, pp. 778–782 describes an Advanced Digital High Definition Television System which comprises an MPEG video encoder. In the MPEG encoder, a video signal is received after it has been processed in a preprocessor. The encoder comprises a device for estimating motion. The article describes a technique for estimating motion in macroblocks of 16×16 pixels with half-pixel accuracy. Motion vectors are generated which indicate the motion of a macroblock in a picture with respect to a previous picture. When a motion vector is known, pixel values can be predicted for a macroblock from a previous, reconstructed picture. For the purpose of compression, the predicted pixel values are subtracted from the actual pixel values of the relevant macroblock. The difference is a residual macroblock. The residual macroblock is further encoded and applied, together with the motion vectors, to an output of the encoder. In this way, use is made of time redundance in the video signal.

It is an object of the invention to enhance the resolution in a video signal.

To this end, the method according to the invention is characterized in that it comprises the step of making a choice between generating and supplying a motion-compensated encoded video signal and generating and supplying a higher-resolution picture having a higher resolution than the pictures of the series, if the motion-compensated encoded video signal is generated, forming the motion-compensated encoded video signal by means of the picture memory, and if the higher-resolution picture is generated, forming the higher-resolution picture from the series of pictures and the motion vectors by means of a picture memory. Forming a higher-resolution picture is based on the availability of sub-resolution motion information and on the presence of aliasing in the video signal. The information present in various pictures is thus used for forming a new picture with a higher resolution. The resolution is the extent of fineness or focus of the picture. In many cases, the resolution will correspond to the number of pixels from which the picture is built up. If a number of pixels is jointly used for displaying the picture information of one pixel, the number of pixels may be larger than the resolution. This occurs, for example, when using a color filter grating which samples color channels through a limited set of pixels, or when projecting a picture on a larger number of pixels without increasing the picture contents. Sub-resolution accuracy involves a greater accuracy than the fineness or focus of the picture and corresponds in many cases to sub-pixel accuracy.

It is to be noted that enhancement of resolution is known per se from European patent application EP 0 731 600. Another method of obtaining a higher-resolution picture is known from the article: Debin Chen et al "Extraction of High-Resolution Video Stills from MPEG Picture Sequences", ICIP '98, October 1998, Chicago. Furthermore, such a method is described in the non-prepublished, international patent application PCT/IB 98/01966, our reference PHN 16.674. In the method described in this document, motion vectors present in an MPEG signal are used for forming the higher-resolution picture.

The known methods are used for displaying the video signal. The enhancement of resolution in accordance with the invention is, however, performed when encoding the video signal in a motion-compensated encoder. Although European patent application EP 0 731 600 describes that the video signal can be remote-displayed via a communication network, this patent application does not give any indication about encoding the video signal in a motion-compensated encoder. An advantage of enhancing the resolution in a motion-compensated encoder is that means for estimating motion are already present in such an encoder. Moreover, there is already a picture memory in which various pictures from the series can be stored. According to the invention, the motion estimator present in the motion-compensated encoder and the picture memory are used to advantage, both for generating the motion-compensated encoded video signal and for generating the higher-resolution picture.

By repeating the method according to the invention, a series of pictures with a higher resolution is supplied from an output of the encoder. In a preferred embodiment of the invention, the series of pictures is adapted to a predetermined standard output signal. This may be, for example, a standard number of pictures per second. Another, generally larger number of lower-resolution pictures per second can be applied to the input, which lower-resolution pictures are used for forming the standard number of pictures at the output with a higher resolution, dependent on the video signal. Two higher-resolution pictures can be combined to one interlaced picture.

Generally, the invention requires storage space for storing the various pictures from the series. This means that there should be more storage space in an encoder in which the resolution is enhanced than in an encoder in which the resolution is not enhanced, because more pictures are generally stored in the case of resolution enhancement. An embodiment complying with the quantity of required storage space is characterized in that the method comprises the steps of selecting a predetermined region of interest from the video signal and storing the series of pictures in the picture memory, the pictures relating to the region of interest. The region of interest forms a sub-signal of the video signal. The region of interest is a preselected sub-region of the display supplied by the video signal. The choice of the region of interest is passed on to the encoder, whereafter the region of interest is selected from the video signal. The sub-pictures relating to the region of interest occupy less space than the full pictures. When the region of interest is sufficiently small, several sub-pictures can be stored in a conventional picture memory without an extension of this memory being required. The conventional picture memory is the picture memory which is present in a comparable encoder in which no higher-resolution picture is formed. In this way, an inexpensive and practical method is possible for enhancing the resolution. A series of sub-pictures of a region of interest is combined to one picture having a higher resolution than the separate sub-pictures, which higher-resolution picture preferably has the same number of pixels as a normal picture.

The motion is preferably estimated in a hybrid encoder in which both motion compensation and other encoding operations are performed. An example is MPEG. An MPEG encoder already comprises standard means for estimating motion and generating motion vectors, and a picture memory for storing the various pictures. A higher-resolution picture may be supplied as an intracoded frame. An MPEG decoder can decode it without additional information. Another example of a compression technique is H.263.

The motion-compensated encoder according to the invention is characterized in that the encoder comprises combination means for forming and supplying a higher-resolution picture from the series of pictures and the motion vectors by means of the picture memory, said higher-resolution picture having a higher resolution than the pictures of the series.

The camera system according to the invention comprises an image sensor for picking up the video signal, and a motion-compensated encoder for encoding the video signal according to the invention. The integration of an encoder according to the invention in a camera system has the advantage that it is simpler to obtain the series of pictures at a high rate. The invention is very suitable for sensor-encoder integration.

These and other aspects of the invention are apparent from and will be elucidated with reference to the embodiments described hereinafter.

The Figures only show those elements which are necessary for understanding the invention.

Figure 1:
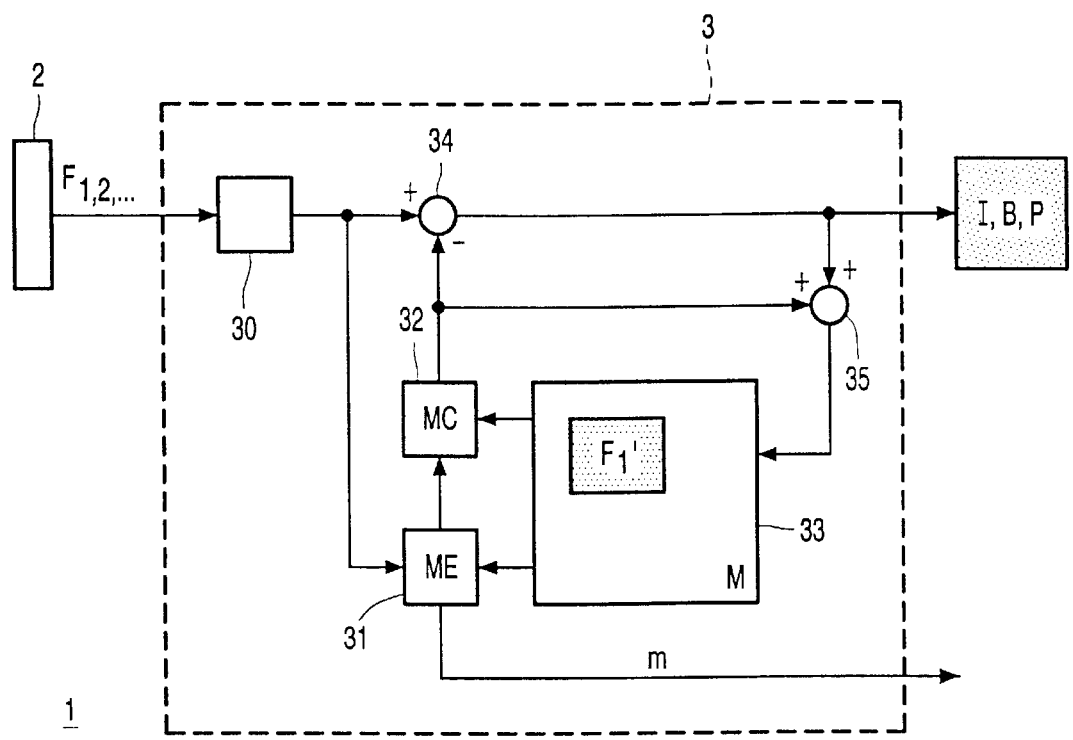
FIG. 1 shows a device comprising a known encoder.

FIG. 1 shows a device comprising a known encoder. It is a camera system 1 comprising an image sensor 2 and a hybrid encoder 3. Encoder 3 comprises receiving means 30, a motion estimator 31, a motion compensator 32 and a picture memory 33. The encoder also comprises a subtracter circuit 34 and an adder circuit 35.

The operation of a known encoder will be roughly explained with reference to FIG. 1. The pictures $F_{1,2}$ ... are present in a video signal coming from the image sensor 2 and are received in the receiving means 30 in the encoder 3. Means which may be present for preprocessing the video signal are not shown. A first picture $F_1$ is applied to the subtracter circuit 34 and to the motion estimator 31. This first picture is encoded without using motion estimation and motion compensation. This means that nothing is subtracted from this first picture $F_1$ in the subtracter circuit 34. It is common practice to subject the picture after the subtracter circuit 34 to various encoding operations so as to compress the signal. In these operations, use is made of the spatial redundance in the pictures. Examples of these encoding operations are Discrete Cosine Transform (DCT) in combination with adaptive quantization, differential coding, run-length coding (RLC) and variable-length coding (VLC). Means for performing these encoding operations are not directly important for the invention and are therefore not shown in the Figure for the sake of clarity. Since the first picture $F_1$ is only subjected to the above-mentioned encoding operations and is not subjected to motion compensation, the result of the encoding operation of the first picture is referred to as I(ntracoded) picture. The I picture is applied to the output of the encoder 3 and also to adder circuit 35. Since no motion compensation has taken place, nothing is added to the I picture in the adder circuit 35. The I picture is reconstructed and subsequently stored as a reconstructed picture $F_1'$ in the memory 33. Various means for reconstructing the I picture meanwhile entirely or partly encoded are not shown for the sake of clarity.

Motion estimation and motion compensation is used for a second picture $F_2$. In the motion estimator 31, the second picture $F_2$ is compared with the $F_1'$ picture reconstructed from the I picture, stored in the memory 33 and being ideally identical to the first picture $F_1$. Per macroblock, motion in the second picture is estimated with respect to the $F_1'$ picture. As a result of this step, motion vectors m are generated which are passed on to an output of the encoder 3. Moreover, a motion-compensated picture associated with these motion vectors m is computed in the motion compensator 32. This is done on the basis of the $F_1'$ picture which is stored in the memory 33. The motion-compensated picture is subtracted in the subtracter circuit 34 from the second picture $F_2$, which results in a residual second picture. The residual second picture is further compressed in accordance with the various encoding methods mentioned hereinbefore. The result is referred to as a P(redictively coded) or B(idirectionally coded) picture, dependent on the motion compensation used. The distinction between P and B pictures is not important for the invention. The residual second picture may be added in the adder circuit 35 to the motion-compensated picture so that a reconstructed second picture is obtained which can be stored in the picture memory 33 for further use for motion compensation.

Figure 2:
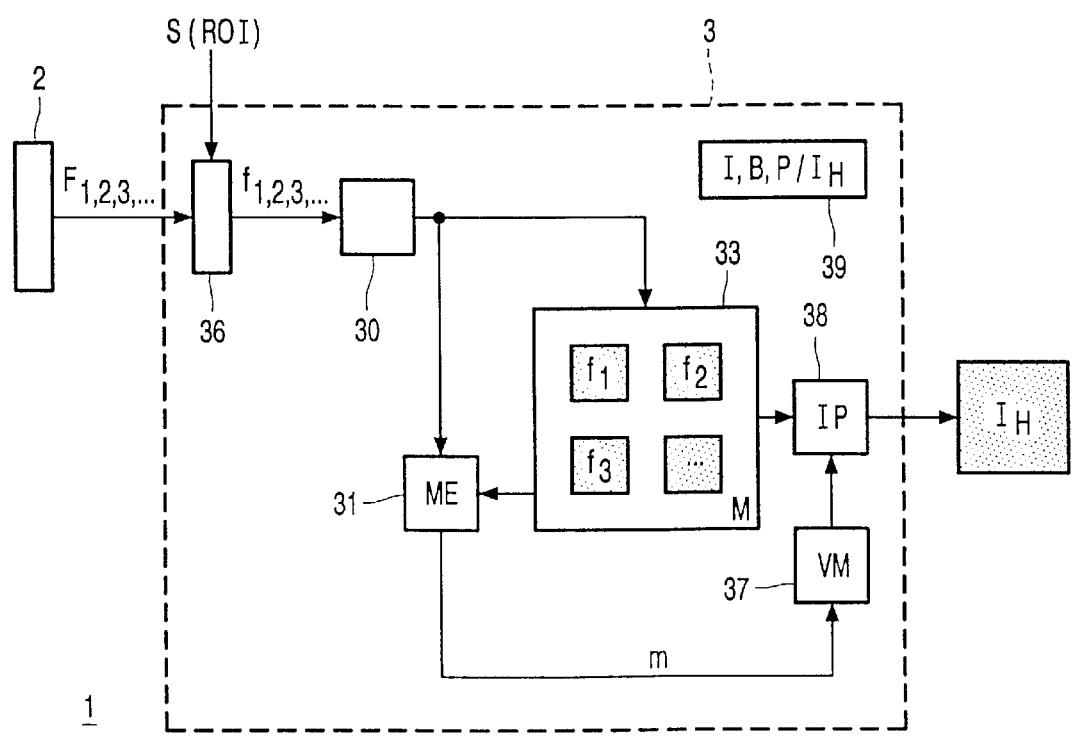
FIG. 2 shows an embodiment of a device according to the invention.

FIG. 2 shows an embodiment of a camera system 1 according to the invention. In addition to the components already mentioned, the camera system in this embodiment comprises selection means 36 for selecting a region of interest (ROI) from the video signal coming from the image sensor 2. The selection means 36 are shown in FIG. 2 within the encoder, but they may alternatively be present outside the encoder 3, in the image sensor 2 or elsewhere. The region of interest is predetermined, for example, by a user watching a display on a display screen. The user may choose, for example, a region of interest because he wants to zoom in on a given partial region of the picture picked up by the image sensor 2. It is only important for the invention that the selection means 36 are notified in a predetermined manner, which is not important for the invention, what should be selected as a region of interest from the video signal. As an example, a signal S(ROI) is applied to the selection means 36 in the embodiment shown, which signal defines the region of interest. The selection means 36 select the data from the video signal associated with the region of interest and pass on these data. The pictures $F_{1,2,3, \ldots}$ in the video signal, coming from the image sensor 2, are reduced to sub-pictures $f_{1,2,3, \ldots}$ by the selection means 36, which sub-pictures only relate to the region of interest. These sub-pictures $f_{1,2,3, \ldots}$ occupy less storage space than the pictures $F_{1,2,3, \ldots}$. This means that various sub-pictures $f_{1,2,3, \ldots}$ can be stored in the same picture memory 33, dependent on the size of the region of interest and on the picture memory 33. If various sub-pictures $f_{1,2,3, \ldots}$ are available, they may be used for enhancing the resolution in accordance with the known methods.

The result of the resolution enhancement is one picture $I_H$ having a higher resolution than the sub-pictures $f_{1,2,3, \ldots}$ of the series. Before it becomes available at the output of the encoder, the higher-resolution picture $I_H$ is generally subjected to the previously mentioned various-encoding operations. The $I_H$ picture has the same format as a standard I picture as described with reference to FIG. 1. A subsequent series of sub-pictures $f_{1,2,3}, \ldots$ is required for a subsequent higher-resolution picture $I_H$. A signal having a given number of sub-pictures $f_{1,2,3}, \ldots$ per second is thus converted into a signal having a smaller or equal number of pictures $I_H$ per second but with a higher resolution per picture $I_H$.

The resolution enhancement may be performed in accordance with the method as known from the previously mentioned European patent application EP 0 731 600. In this application, a method is described in which one of the pictures with a lower resolution is selected as the reference picture. The relative motion between the pixels of the reference picture and each of the other pictures is estimated with a sub-resolution accuracy. When using the motion estimated in this way, the lower-resolution pictures are scaled with reference to the high-resolution domain and combined for forming the high-resolution picture. The relative motion is represented in the form of a mapping transform.

The higher-resolution picture $I_H$ is preferably formed from the series of sub-pictures $f_{1,2,3}, \ldots$ while using motion vectors m which are generated in a motion estimation process 31. This may be done, for example, in accordance with the method as described in the previously mentioned article by Debin Chen et al. In accordance with the Chen method, the resolution of an I picture is enhanced while using the next P and B pictures and the associated motion vectors m. These pictures are up-sampled whereafter a reduced sub-pixel searching process starts for matching macroblocks with the up-sampled video picture while using the half pixel motion vectors m as initial value conditions.

In a practical embodiment in accordance with the international patent application mentioned hereinbefore, the motion vectors m are directly used for matching or interpolating the macroblocks with the up-sampled video picture.

The motion estimator 31 and the picture memory 33 are already present in a standard encoder as shown in, for example, FIG. 1. Components which are further necessary are a vector memory 37 for storing motion vectors, and an interpolator 38. Furthermore, a complicated addressing scheme is necessary because several pictures must be stored simultaneously in the memory and further used for reconstructing the higher-resolution picture $I_H$. A great advantage is that when enhancing the resolution in the encoder 3, many components already present in a known standard encoder 3 can be used, the most important of which are the motion estimator 31 and the picture memory 33.

The sub-pictures $f_{1,2,3}, \ldots$ from the series are not encoded pictures such as I, B and P pictures but sub-pictures $f_{1,2,3}, \ldots$ of pictures $F_{1,2,3}, \ldots$ as come in from the receiving means 30 from the image sensor 2. These sub-pictures $f_{1,2,3}, \ldots$ do not need to be decoded first.

The sub-pictures $f_{1,2,3}, \ldots$ from the video signal are not only passed on to the picture memory 33 for the resolution enhancement but also to the motion estimator 31. A first sub-picture $f_1$ is applied to the picture memory 33 without motion being estimated. For subsequent sub-pictures $f_{2,3}, \ldots$, the motion is preferably estimated with respect to the sub-picture preceding and/or succeeding said sub-picture. The reason is that this yields a better result for the motion estimation than the use of a reference picture. The motion vectors m obtained are stored in the vector memory 37. The phase of storing sub-pictures $f_{1,2,3}, \ldots$, the estimation of motion and the storage of the motion vectors m may be referred to as the "collection phase". This is a first phase of the resolution enhancement.

A second phase is the construction of the higher-resolution picture $I_H$. This phase may be referred to as the "interpolation phase". Interpolation is preferably performed while using the motion vectors m. The sub-pictures $f_{1,2,3}, \ldots$ which are stored in the picture memory 33 are interpolated to a higher-resolution picture $I_H$ by means of the motion vectors m. This interpolation takes place in an interpolator 38. Interpolator 38 is coupled to the picture memory 33 and to the vector memory 37. Interpolator 38 constructs the higher-resolution picture $I_H$ from the series of sub-pictures $f_{1,2,3}, \ldots$ which is available from the picture memory 33, while using the motion vectors m which are available from vector memory 37, in analogy with the known methods. Alternatively, a method other than interpolation may be used for forming the higher-resolution picture $I_H$ The advantage of interpolation is that it can be performed in a relatively simple and rapid way.

The higher-resolution picture $I_H$ is further compressed in the conventional manner. This picture $I_H$ is passed on as a normal I picture in this embodiment. Successive higher-resolution pictures $I_H$ can be passed on without motion compensation taking place. It is alternatively possible to perform motion compensation on the higher-resolution pictures $I_H$. For this purpose, a method as described with reference to FIG. 1 is required, for which storage space is necessary in the picture memory 33 or in another memory. Dependent on the size of the higher-resolution picture $I_H$ and the picture memory 33, the picture memory requires extension or no extension. A control unit 39 determines whether the encoder supplies a motion-compensated encoded video signal or a higher-resolution picture $I_H$.

Figure 3A:
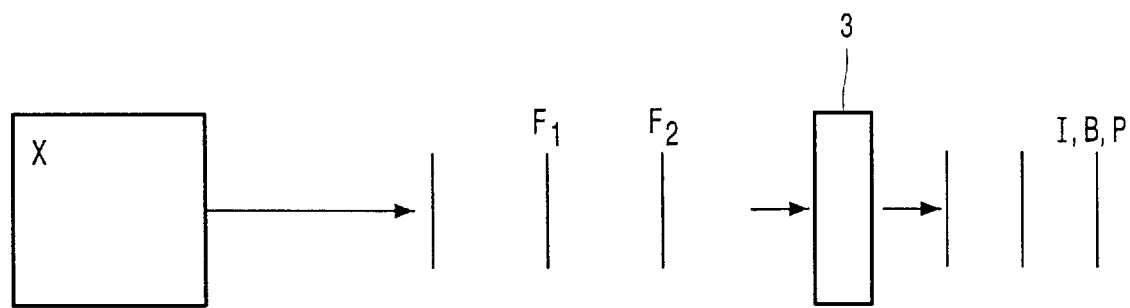
FIGS. 3A, 3B illustrate the input and output of an encoder in a preferred embodiment according to the invention.
Figure 3B:
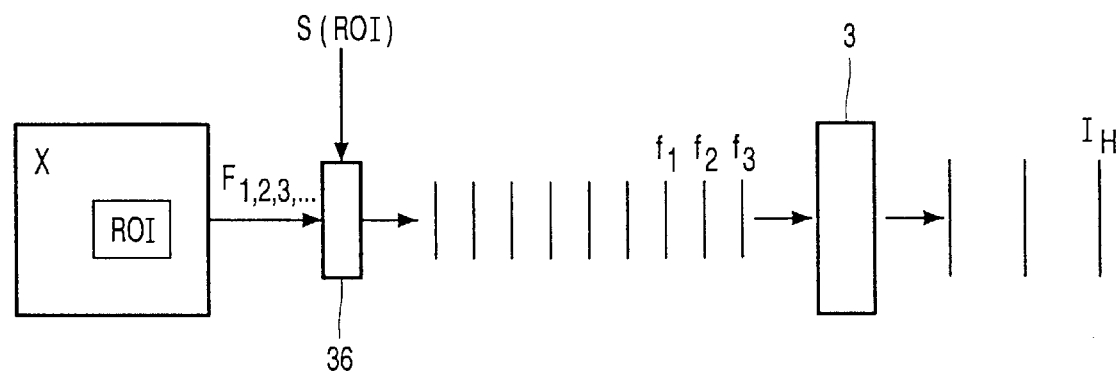

FIGS. 3A, 3B illustrate the input and output of the encoder 3 in accordance with a preferred embodiment of the invention. FIG. 3A shows a normal video mode, as described with reference to FIG. 1. Input pictures $F_{1,2}, \ldots$ relating to a display X are applied to the encoder 3 and encoded therein. The output consists of encoded pictures I, B, P.

FIG. 3B shows a ROI video mode. A region of interest ROI is chosen from the video signal and forms a sub-region of the display X. The sub-pictures $f_{1,2,3}, \ldots$ relating to the region of interest ROI are sub-pictures of pictures $F_{1,2,3}, \ldots$ which relate to the display X. The sub-pictures $f_{1,2,3}, \ldots$ are selected in the selection means 36 from the pictures $F_{1,2,3}, \ldots$, dependent on signal S(ROI). The input $f_{1,2,3}, \ldots$ is used in the encoder 2 for forming the higher-resolution pictures $I_H$. The nine sub-pictures $f_{1,2,3}, \ldots$ form three series of three sub-pictures in this example. This results in three high-resolution pictures $I_H$ which are each interpolated from three sub-pictures of one series and associated motion vectors m. The same rate for higher-resolution pictures $I_H$ is thereby achieved as for pictures I, B, P in the normal video mode, while the rate for the sub-pictures $f_{1,2,3}, \ldots$ is three times as high. The number of three sub-pictures $f_{1,2,3}, \ldots$ per series is only an example; a different number or a non-constant number may be used alternatively. It is not necessary that the sub-pictures $f_{1,2,3}, \ldots$ occur successively in the video signal. It is alternatively possible to use one or more sub-pictures from the series $f_{1,2,3}, \ldots$ in a subsequent series of sub-pictures for forming a subsequent higher-resolution picture $I_H$. In both FIG. 3A and FIG. 3B, the output signal complies with the same standard and can be decoded with the same decoder. Although it relates to a region of interest, an $I_H$ picture corresponds for a decoder to a normal I picture. It is necessary for this embodiment that the pictures of the region of interest $f_{1,2,3}, \ldots$ are available at a sufficiently high rate. A combination of the encoder 3 with the image sensor 2 as shown in FIG. 2 provides the advantage that it is easier to obtain pictures $f_{1,2,3}, \ldots$ at a high rate from the sensor 2, and that it is also easier to adapt the encoder 3 to the sensor 2.

Dependent on the size and number of regions of interest ROI per series, the picture memory 33 requires an extension or no extension. Preferably, the regions of interests ROI are chosen to be such that it is possible to enhance the resolution in the encoder without extending the picture memory 33 with respect to the normal video mode. Then it is possible to perform both a normal mode (see FIGS. 1 and 3A) and a ROI video mode (see FIGS. 2 and 3B) with a minimum number of extra components. If the picture memory 33 is extended, it is also possible to use more and/or larger regions of interests ROI for the entire display X, or for using I, B, P sequences.

For some applications, it is advantageous to combine two higher-resolution pictures to one interlaced picture.

An example of a practical embodiment of the invention is a CMOS PC camera.

Instead of the word 'picture' in the description above, it is also possible to use the word 'frame' or 'field', dependent on the relevant video standard.

It is to be noted that the embodiments mentioned hereinbefore illustrate rather than limit the invention. Those skilled in the art will be able to conceive alternative embodiments without departing from the scope of the appendant claims.

Reference figures between parentheses in the claims are included for elucidation of the claims and should not be construed as limiting the claim.

The word "comprise" and its conjugations does not exclude the existence of elements or steps other than those mentioned in a claim. The invention may be realized by using separate elements or by a suitably programmed computer.

In the claims relating to the encoder or the camera system, in which various means are mentioned, various ones of these means may be formed in one and the same piece of hardware.

What is claimed is:

1. A method of encoding a video signal comprising a series of pictures ($f_{1,2,3}, \ldots$) in a motion-compensated encoder (3), said method comprising the steps of:
   receiving (30) the series of pictures ($f_{1,2,3}, \ldots$); and
   estimating (31) motion vectors (m) in the series of pictures ($f_{1,2,3}, \ldots$) with sub-resolution accuracy,
   making a choice (39) between generating and supplying a motion-compensated encoded video signal (I, B, P) and generating and supplying a higher-resolution picture ($I_H$) having a higher resolution than the pictures ($f_{1,2,3}, \ldots$) of the series,
   if the motion-compensated encoded video signal is generated, forming (38) the motion-compensated encoded video signal (I, B, P) by means of a picture memory (33), and
   if the higher-resolution picture ($I_H$) is generated, forming (38) the higher-resolution picture ($I_H$) from the series of pictures ($f_{1,2,3}, \ldots$) and the motion vectors (m) by means of the picture memory (33).

2. A method of encoding a video signal for obtaining a series of higher-resolution pictures ($I_H$), comprising the repeated generation and supply of a higher-resolution picture ($I_H$) as claimed in claim 1, wherein the series of higher-resolution pictures ($I_H$) is adapted to a predetermined standard output signal.

3. A method as claimed in claim 2, wherein two higher-resolution pictures ($I_H$) are combined to one interlaced picture.

4. A method as claimed in claim 1, further comprising the steps of:
   selecting (36) a predetermined region of interest (S(ROI)) from the video signal, and
   storing the series of pictures ($f_{1,2,3}, \ldots$) in the picture memory (33), said pictures ($f_{1,2,3}, \ldots$) relating to the region of interest (S(ROI)).

5. A motion-compensated encoder (3) for encoding a video signal comprising a series of pictures ($f_{1,2,3}, \ldots$), said encoder (3) comprising:
   receiving means (30) for receiving the series of pictures ($f_{1,2,3}, \ldots$),
   estimation means (31) for estimating motion vectors (m) in the series of pictures ($f_{1,2,3}, \ldots$) with sub-resolution accuracy;
   a picture memory (33) for storing the pictures ($f_{1,2,3}, \ldots$), and
   means for forming and supplying a motion-compensated encoded video signal (I, B, P) by means of the picture memory (33),
   combination means (38) for forming and supplying a higher-resolution picture ($I_H$) from the series of pictures ($f_{1,2,3}, \ldots$) and the motion vectors (m) by means of the picture memory (33), said higher-resolution picture ($I_H$) having a higher resolution than the pictures ($f_{1,2,3}, \ldots$) of the series.

6. A motion-compensated encoder as claimed in claim 5, further comprising:
   selection means (36) for selecting a predetermined region of interest (S(ROI)) from the video signal,
   the picture memory (33) being suitable for storing the series of pictures ($f_{1,2,3}, \ldots$), said pictures ($f_{1,2,3}, \ldots$) relating to the region of interest (S(ROI)).

7. A camera system (1) comprising:
   an image sensor (2) for picking up a video signal which comprises a series of pictures ($f_{1,2,3}, \ldots$), and
   a motion-compensated encoder (3) for encoding the video signal as claimed in claim 5.

* * * * *